United States Patent [19]
Carr

[11] Patent Number: 5,199,461
[45] Date of Patent: Apr. 6, 1993

[54] FLUID DISTRIBUTION VALVE

[75] Inventor: Peter Carr, Cary, N.C.

[73] Assignee: Instatherm Company, Cary, N.C.

[21] Appl. No.: 909,089

[22] Filed: Jul. 2, 1992

[51] Int. Cl.5 .......................................... F16K 11/052
[52] U.S. Cl. ............................... 137/625.44; 137/875; 251/65
[58] Field of Search .................... 137/625.44, 872, 875; 251/65

[56] References Cited

U.S. PATENT DOCUMENTS

| | | | |
|---|---|---|---|
| 2,284,059 | 5/1942 | Kehn et al. | 137/625.44 X |
| 3,265,062 | 8/1966 | Hesse | 251/65 X |
| 3,370,305 | 2/1968 | Goott et al. | 251/65 X |
| 3,545,470 | 12/1970 | Paton | 137/625.44 X |
| 3,895,650 | 7/1975 | Cadiou | 137/875 |
| 4,267,880 | 5/1981 | Jacquet | 137/875 X |
| 4,498,528 | 2/1985 | Jacquet | 137/625.44 X |
| 4,646,531 | 3/1987 | Song | 251/6 S X |
| 4,874,012 | 10/1989 | Velie | 251/65 X |

Primary Examiner—John Rivell
Attorney, Agent, or Firm—Bell, Seltzer, Park & Gibson

[57] ABSTRACT

The invention is directed to a fluid distribution valve including a housing having at least three ports and a flap member for selectively closing the ports. The flap member is mounted by at least two mounting means which provide for pivoting of the flap about two different predetermined axes. At least one of the mounting means can be selectively engaged and disengaged to provide for pivoting of the flap member about a selected one of the two different axes. In a preferred embodiment, the valve of the invention is employed in combination with an air conditioning and cool storage system for a vehicle, such as a truck.

22 Claims, 3 Drawing Sheets

FLUID DISTRIBUTION VALVE

FIELD OF INVENTION

The invention relates to a valve for controlling fluid flow through the valve from and to selected ones of a plurality of different ports. More specifically, the invention relates to a flap valve for controlling fluid flow, preferably air flow, to and from selected ones of a plurality of ports. The invention also relates to an improved air flow distribution system for use with cool storage units.

BACKGROUND OF THE INVENTION

There are a variety of valve devices available and in commercial use for directing the flow of fluids, such as heated or cooled air in heating and cooling systems along different pathways. These devices range from simple damper mechanisms to complicated valve arrangements for providing alternate flow pass. Typically, simple devices are advantageous in providing ease of manufacture, assembly and maintenance but are disadvantageous in providing only limited control of flow direction and distribution. More complicated devices can provide a greater degree of control of flow distribution but can be limited by intricate mechanisms and expensive additional power supplies required to operate the devices.

For example, U.S. Pat. No. 4,580,486 to Schulz discloses an apparatus for supplying air to various compartments wherein a simple flap is provided for closing an air passageway. The flap freely swings about a single pivot point and is associated at its closed position with an electromagnet.

U.S. Pat. No. 4,807,665 discloses a three-way two position valve actuated by an electromagnet. Air flow distribution is provided by a valve closing element which is swivel mounted at the intersection of three ducts. An actuating tappet is pivotably articulated at one end to the valve closing element and is pivotably connected at the other end to an actuating element, which is actuated by an electromagnet. Actuation of the electromagnet results in movement of the tappet with resulting movement of the valve closing element. The resulting arrangement provides for air flow distribution along only two alternative pathways and the operating mechanism is relatively complex.

U.S. Pat. No. 4,228,786 to Frankenfeld discloses a flow director providing a damper rotatably mounted within a diverting box to provide for different flow directions. Another relatively complex air distribution device is disclosed in U.S. Pat. No. 4,267,880 to Jecquet which describes a two branched V-shaped flap member rotatably mounted within a specially designed housing. A shutter-type fluid distribution valve is disclosed in U.S. Pat. No. 3,895,650 to Cadiou which involves the use of two substantially parallel flap-valves operatively interconnected with each other.

Fluid flow distribution arrangements, such as discussed above are desirable and useful in a variety of systems including heating and air conditioning systems as indicated previously. Recently, substantial commercial interest has been directed at thermal storage systems wherein a media capable of storing heat and/or cooling is employed. These systems can be particularly desirable and useful in connection with heating and air conditioning systems of buildings and vehicles. For example, with air conditioning systems, a cool storage medium can be cooled during off peak hours and then used for cooling during peak hours. Thermal charging of a cool or heat storage unit requires that air be diverted from its normal path, to a charging path where it is directed across the thermal storage medium. Similarly, when the thermal storage media is used to heat or cool an enclosure, air is directed across the media and to the enclosure. See U.S. Pat. No. 4,922,998 to Carr which discloses a thermal energy storage apparatus and system, hereby incorporated by reference.

Thermal energy storage systems, such as discussed above, and other heating and air conditioning or fluid flow systems can employ arrangements which require air flow in differing directions, through and from a plurality of different sources in order to be effectively operated. However, various fluid flow distribution valves which are commercially available often achieve the required flow distribution only by employing relatively complex and expensive devices and/or are incapable of providing for a plurality of different fluid flow directions using a single valve.

SUMMARY OF THE INVENTION

The invention provides an improved fluid flow distribution valve which can be simple in construction, manufacture and installation. In various preferred embodiments, the valve can include only a single moving part but nevertheless is capable of directing fluid flow along selected ones of three or more different paths. The valve is particularly useful in air distribution systems including thermal storage systems for vehicles.

The fluid distribution valve of the invention includes a housing having at least three ports communicating between the interior and exterior of the housing. A flap member sized for selectively closing the ports is mounted in the housing by mounting means including a first mounting means mounting the flap for pivoting about a first predetermined axis for closing at least one of the ports and a second mounting means mounting the flap for pivoting about a second predetermined axis for closing another of the ports. At least one of the mounting means is selectively engageable and disengageable and the valve further includes a means for selectively engaging and disengaging the engageable and disengageable one of the mounting means. Advantageously, the first mounting means is adapted and arranged for supporting pivoting of the flap member between a first position which closes the first of the three ports while allowing communication between the other two ports through the housing, to a second position which closes the second of the three ports while allowing communication between the first and third port through the housing. The second mounting means advantageously is arranged to support pivoting of the flap member between the first position in which the first port is closed and a third position in which the third port is closed and the first and second ports communicate through the housing with each other.

Advantageously, movement of the flap member from one position to another is achieved solely by the force of fluid, e.g. air, forced through one of the ports by a fan or blower, and by the force of gravity. In a preferred embodiment of the invention, the flap member is a rectangularly shaped member having shaft members attached on opposed sides thereof and the shafts define the first and second predetermined axis of pivoting. Advantageously the shafts are composed of steel, iron or a similar metal susceptible to magnetic attraction. Preferably, an electromagnet is provided adjacent the first shaft member and a weaker permanent magnet is provided adjacent the other shaft member. In a first position, the flap is seated substantially horizontally above and closing a first port and is retained in this position by gravity. When the electromagnet is energized, and air is forced upwardly through the first port, the flap member pivots about the first shaft for movement to a second position which closes the second port. When the electromagnetic is de-energized, air moving through the first port causes the flap to pivot about the second shaft to a third position closing the third port while allowing communication through the valve housing between the first and second ports.

Although the fluid distribution valve of the invention is useful in numerous and various environments, in one preferred embodiment of the invention the valve is incorporated into a thermal storage and cooling system of a motor vehicle of the type having a cooled sleeping area. In this embodiment of the invention, the valve is arranged between separate air ducts. One air duct communicates between the valve and an air conditioning unit. A second air duct communicates between the valve and a thermal storage unit while a third air duct communicates between the valve and an outlet positioned adjacent a sleeping compartment in the motor vehicle. The valve provides for selective movement of air from the air conditioning unit to the sleeper compartment; from the air conditioning unit to the cool storage unit for charging of the cool storage unit; and from the cool storage unit to the sleeper compartment.

BRIEF DESCRIPTION OF THE DRAWINGS

In the drawings which form a portion of the original disclosure of the invention.

DETAILED DESCRIPTION OF THE INVENTION

In the following detailed description, preferred embodiments of the invention are described in detail. It will be recognized that the invention is susceptible to numerous modifications and variations and that although specific terms are used in describing the invention these are used in the descriptive sense only and not for purposes of limitation.

Figure 1:
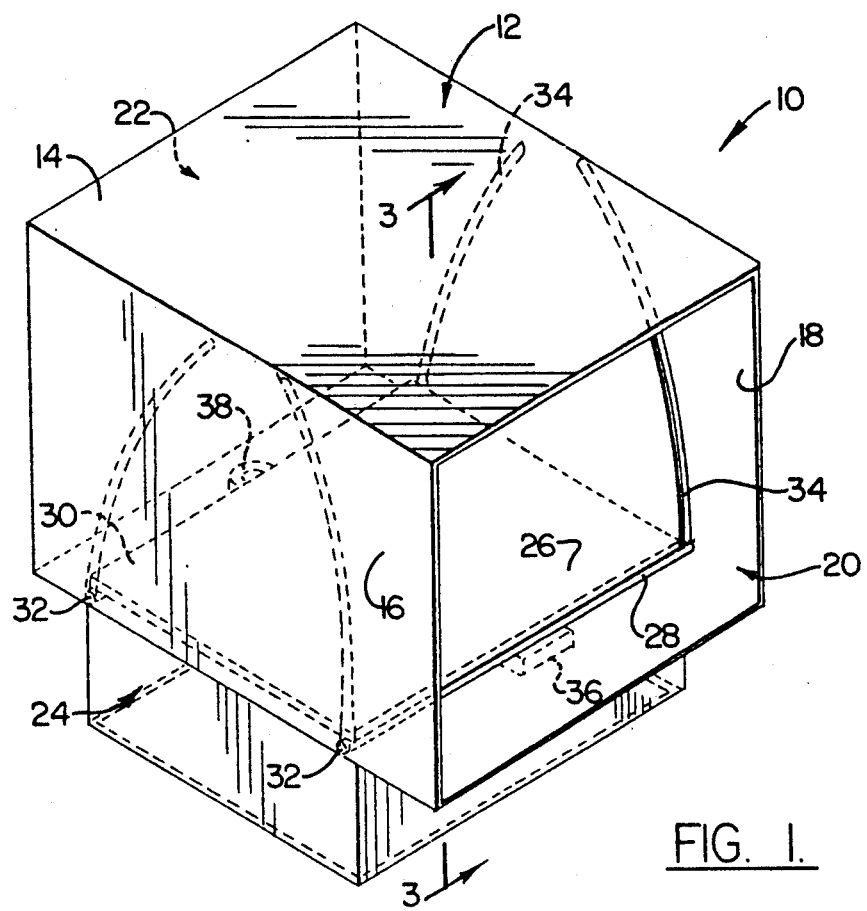
FIG. 1 is a perspective view of a preferred fluid distribution valve according to the invention.

FIG. 1 illustrates in perspective a preferred flow distribution valve 10 according to the invention. As illustrated, the valve includes a housing 12 including a closed top 14, and two closed front and side walls, 16 and 18 respectively which, together define two opposed open side ports 20 and 22 and an open bottom port 24. A substantially planer flap member 26 is supported within the housing 12 and is shown covering the bottom port 24 of the valve. Flap member 26 can be made of plastic, metal or other materials.

In the embodiment of the invention illustrated in FIG. 1 the flap member 26 is a generally rectangular member having a shaft 28 fixedly secured along and beneath one of its four sides and a second shaft 30 fixedly secured to the underneath of an opposed side of the flap member 26. The shafts are composed of, or include a metal which can be attracted by a magnet such as steel or iron. The shafts 28 and 30 are sized to be slightly longer than the width of the flap member 26 so that small end portions 32 extend beyond the front and back edges of the flap member 26. The small end portions 32 are received in four slots 34 integrally formed in the side walls of the housing 12 which assist in guiding the flap member 26 from one position to another as discussed in greater detail below. An electromagnet 36 is positioned in housing 12 beneath shaft 28. A permanent magnet 38 is positioned in the housing 12 beneath shaft 30.

The extended ends 32 of the shafts 28 and 30, and slots 34 serve to guide pivoting of the flap from one position to another. Such guides are optional and in one especially preferred embodiment only one of the shafts, shaft 30, incudes extended end portions 32. In this embodiment only two slots 34 are provided for receiving the two end portions 32 of shaft 30.

Figure 2:
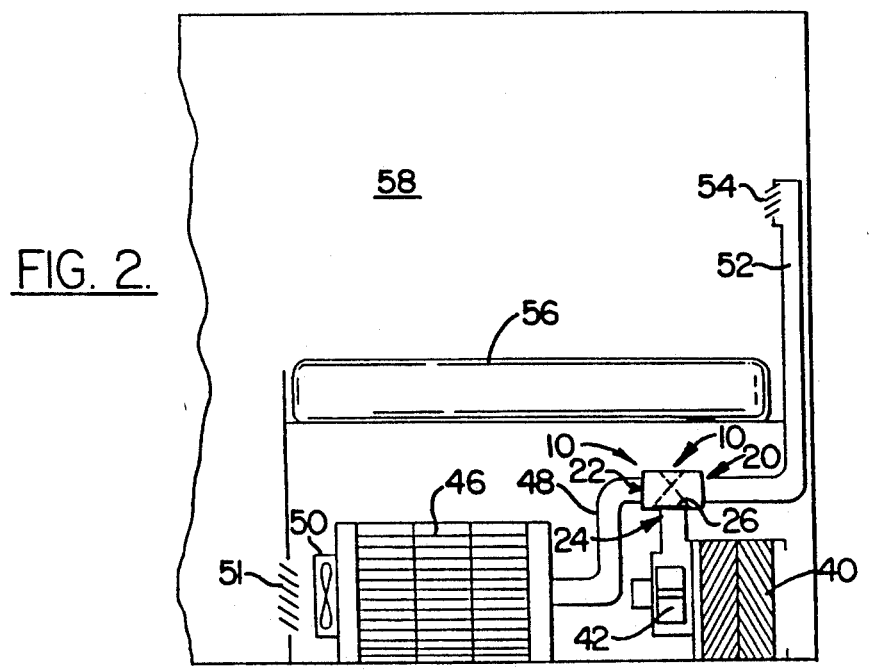
FIG. 2 is a schematic view of a thermal storage and air conditioning system of the invention for a sleeper compartment of a vehicle and employing the flow distribution valve of the invention.

FIG. 2 illustrates use of the flow distribution valve 10 in a cooling/cool storage system of a motor vehicle having a sleeping compartment, such as a truck. In FIG. 2, valve 10 is connected at port 24 to an air conditioning unit 40 which includes a blower 42 for forcing cooled air upwardly through duct 44 which is connected to valve 10 at port 24. A cool storage unit 46 which is preferably of the type disclosed in U.S. Pat. No. 4,922,998, is connected via a duct 48 to port 22 of valve 10. Cool storage unit 46 includes a separate blower unit 50, which when energized, forces air through the cold storage unit 46 for cooling thereof. Valve 10 is also connected at port 20 via a third duct 52 to a cool air outlet 54 which is positioned above a sleeping unit including a bed unit 56 within the interior 58 of a vehicle, not shown.

In the cooling/cool storage unit illustrated in FIG. 2, valve 10 functions to direct air from air conditioning unit 40 and cool storage 46 selectively along three different parts to provide proper functioning of the cooling/cool storage system. Specifically, when cool storage unit 46 is to be charged, cooled air is forced by fan 42 of the air conditioning unit 40 and through the cool storage media in cool storage 46 and thereafter through inlet outlet 51 into enclosure 58. At nighttime, the cool storage unit fan 50 is activated and the air conditioning unit 40 is deactivated. In this case, warm air is forced through cool storage unit for cooling and then through duct 48 and duct 52 to air outlet 54 for cooling of enclosure 58. In a third configuration, the valve 10 directs air directly from air conditioning unit 40 upwardly along duct 44 and through duct 52 to air outlet 54 for cooling of enclosure 58.

Figure 3:
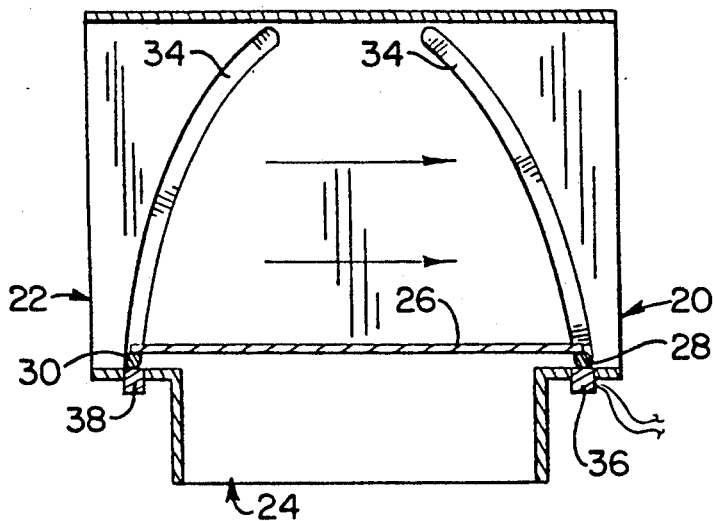
FIG. 3 is a cross-sectional view taken along line 3—3 of FIG. 1 and illustrates the flap member in a first position blocking a first port.
Figure 4:
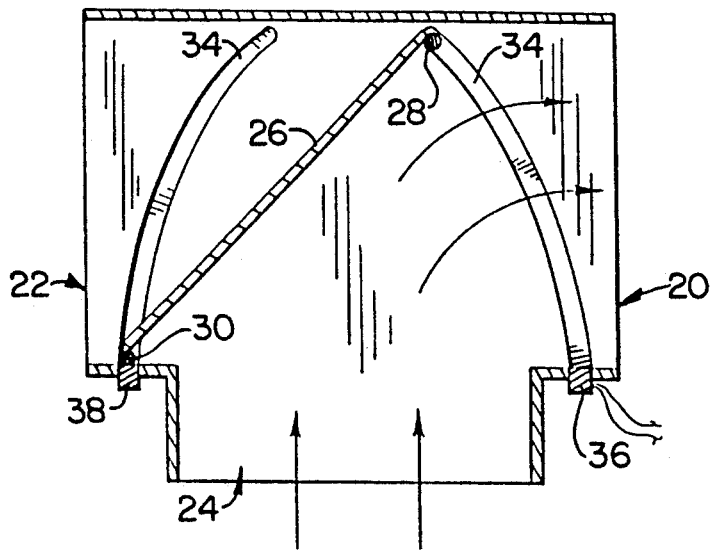
FIG. 4 is a cross-sectional view of the valve, similar to FIG. 3 but showing the flap member in a second position blocking a second port.
Figure 5:
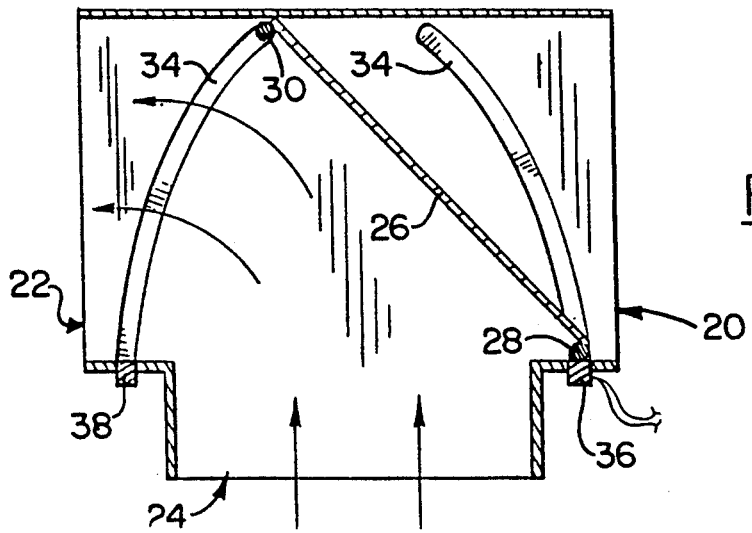
FIG. 5 is a cross-sectional view of the valve, similar to FIG. 3 but showing the flap member in a third position blocking a third port.

Operation of the valve 10 is illustrated in FIGS. 3, 4 and 5. In FIG. 3, the flap member 26 is shown in a position seated for closure of port 24 and directing air flow between ports 20 and 22. Thus, forced air entering into the valve 10 through port 22 passes directly through the valve and outwardly through port 20. Because the valve 10 is oriented with the port 24 oriented downwardly, the flap member 26 is maintained in the seated position illustrated in FIG. 3 primarily by the force of gravity. In addition, the permanent magnet 38 aids in maintaining the flap member 26 in the substantially horizontal position shown in FIG. 3. The electromagnet 36 may be energized or de-energized in the arrangement shown in FIG. 3. When the electromagnet is energized, it can further assist in maintaining the flap member 26 in its horizontal position illustrated in FIG. 3.

In FIG. 4, the electromagnet 36 is de-energized and forced air is introduced into the valve 10 through port 24. The magnetic force between permanent magnet 38 and the shaft 3 maintains the shaft 30 in a mounted position adjacent the magnet thereby enabling the flap member 26 to pivot about shaft 30. As the flap member 26 pivots upwardly, due to the force of air entering via port 24, the short end portions 32 of shaft 28 ride within slots 34 (best seen in FIG. 1) thereby guiding the flap member 26 to the diagonally oriented position shown in FIG. 4 wherein port 22 is closed and air is directed from port 24 to port 20. When the supply of forced air to port 24 is discontinued, the force of gravity returns flap member 26 to the substantially horizontal position sealing port 24 as shown in FIG. 3. It will be apparent that arranging the closure position of the flap in a diagonal position for closure of port 22 places the flap in a position such that it is readily returned by gravity to the horizontal position when the supply of forced air to port 22 is stopped.

In FIG. 5, the flap member 26 is shown in its third position. This configuration is achieved by energizing electromagnet 36 which is stronger than permanent magnet 38, and by introducing forced air into the valve via port 24. The forced air introduced via port 24 forces the flap member 26 upwardly. Because the magnetic attraction between electromagnetic 36 and shaft 28 is greater than the magnetic attraction between permanent magnet 38 and shaft 30, shaft 28 remains in a mounted position adjacent electromagnet 36 and the flap member pivots about shaft 28. The small end portions 32 of shaft 30 ride within slots 34 to direct the flap member 26 to the position shown in FIG. 5 wherein port 20 is substantially closed and air is directed from port 24 to port 22.

The fluid distribution valve of the invention is susceptible to numerous variations both as to the engageable and disengageable pivotable mounting means employed in the valve and as to the force means for achieving pivoting of the flap member. In addition, it will be apparent that although the flap member has been illustrated as a rectangular, planer member, the flap member can readily have other shapes, such as a circular or oval shape, and can include contoured surfaces for improved seating across the various ports where desirable. In addition, although the fluid distribution valve of the invention has been illustrated in connection with a three port valve, it will be apparent that the valve of the invention can include further ports where desirable. Moreover, as discussed in greater detail below, the ports can be arranged in different positions where necessary or desirable.

In the embodiment illustrated in FIGS. 2-5, a permanent magnet and an electromagnet are used as engageable and disengageable mounting means for mounting of the flap member for pivoting about two different axis.

The permanent magnet employed is chosen to have a strength sufficient to hold the shaft 30 in engagement during pivoting of the flap member. On the other hand, the magnet has less strength than the force exerted on the flap member by air pressure moving upwardly through port 24 thus allowing the flap to pivot about shaft 28 when the electromagnet is not energized. In an alternative embodiment of the invention, an electromagnet is used for mounting one of the shafts and a weighted shaft is chosen as the second mounting means. In this instance, the flap pivots about the weighted shaft when the electromagnet is not actuated and the strength of the electromagnet is selected to provide a force greater than the gravitational force of the weighted shaft. Accordingly, the electromagnet preferentially engages the adjacent shaft for pivoting of the flap about that shaft when the electromagnet is actuated. In this embodiment of the invention, the weight is chosen to be great enough to allow the flap member to remain seated when it is in the first position illustrated in FIG. 3 yet light enough to be lifted by available air pressure in the position illustrated in FIG. 5.

In another embodiment of the invention, the mounting means for the flap member 26 can be a first permanent magnet and a second permanent magnet stronger than the first permanent magnet. In this embodiment, a solenoid actuator is provided adjacent the stronger permanent magnet for moving the flap member away from the strong permanent magnet for disengagement of this mounting means. Without actuating of the solenoid, the engagement between the weak magnet and the flap will be broken and the flap will pivot about the strong permanent magnet. When the solenoid is actuated, engagement with the strong magnet is broken and the flap pivots about the weak permanent magnet. Similarly, two electromagnets can be readily be employed and sequenced depending on the direction of flow required.

Engageable and disengageable mechanical mounting means can also be employed in the invention. Thus, an engageable and disengageable locking member can pivotably lock either of the shafts 30 and 28 into position for pivoting of the flap about the desired shaft or the stub end portions 32 of the shafts can be engageably and disengageably locked into a desired position in the slots 34 to allow pivoting of the flap member about the locked shaft.

As illustrated in FIGS. 1 and 3-5, the force for pivoting of the flap from one position to another is preferably supplied by gravity and by fluid, i.e. air pressure from blowers operatively connected to various ports of the valve. When air pressure is used for effecting pivoting of the flap member, the mass and shape of the flap member are selected based on the fluid pressure exerted by blower on the flap, such that the fluid pressure readily causes the flap to pivot from one position to another. In another embodiment of the invention, springs or similar biasing means can be used to return the flap member from one position to another, for example, when the valve is not installed with one port oriented substantially horizontally and downwardly. Thus, a spring member can be attached between either or both of shafts 30 and 28 and a corresponding location on the valve housing near the location of the magnet 38 or electromagnet 36, respectively. In this event, the flap member 26 will be returned to the position of FIG. 3 by the spring members from either position shown in FIG. 4 or in FIG. 5 when air pressure into port 24 is discontinued. Similarly, mechanical means such as a motor means, can be incorporated into the valve to effect pivoting of the flap member one position to another, although it is preferred to employ fluid pressure to effect the pivoting.

Figure 6:
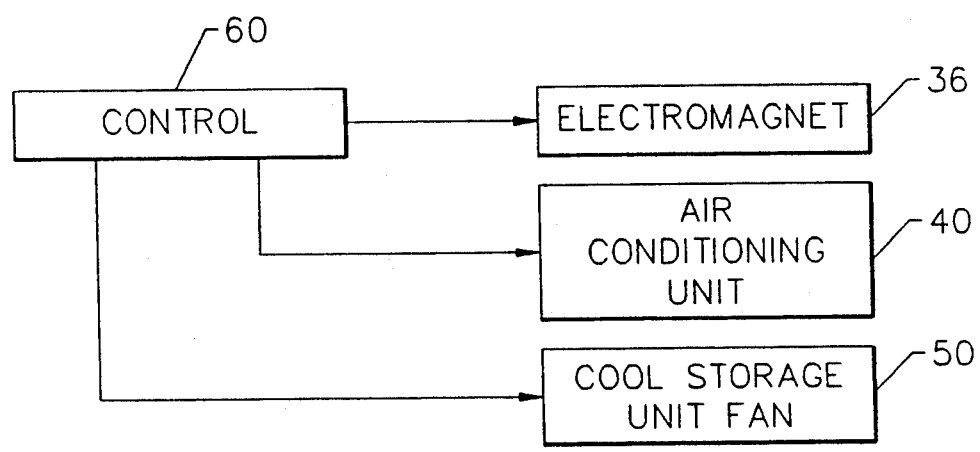
FIG. 6 is a block diagram of a control system for the system of FIG. 2.

FIG. 6 illustrates schematically a control system which can be employed with the valve illustrated in FIG. 1 when used in combination with the air conditioning thermal storage system illustrated in FIG. 2. A control system 60 is operatively connected to electromagnet 36 and to air conditioning unit 40 and to cool storage unit fan 50. When it is desired to cool the interior of the motor vehicle and to charge the cooling storage unit shown in FIG. 2, the control system energizes air conditioning unit 40 and electromagnet 36 while deactivating cool storage unit fan 50. This in turn causes the valve 10 of FIG. 2 to achieve the position illustrated in FIG. 5 which directs air from the air conditioning unit 40 through the valve 10 and into the interior 58 of a vehicle. When it is desired to cool the interior of the motor vehicle without use of the cool storage unit 46, control unit 60 deactivates electromagnet 36 and activates air conditioning unit 40. This in turn causes valve 10 to operate in the configuration shown in FIG. 4. When the thermal storage unit 46 is fully charged and it is desired to cool the vehicle interior without using air conditioning unit 40, control unit 60 deactivates electromagnet 36 and air conditioning unit 40 while energizing cool storage unit fan 50. This in turn causes valve 10 to achieve the configuration illustrated in FIG. 3 which directs cooled air from the cool storage unit 46 through valve 10 and thereafter through cool air outlet 54 for cooling of the vehicle interior 58.

It will be apparent that the valve of the invention can be used in numerous and various environments in addition to those specifically described above. The invention has been described in considerable detail with reference to its preferred embodiments. However, it will be apparent that variations and modifications can be made without departure from the spirit and scope of the invention has described in the foregoing specification and defined in the appended claims.

That which is claimed is:

1. A fluid distribution valve comprising:
   a housing having at least a first, a second and a third port each communicating between the interior and exterior of the housing;
   a flap member adapted for selectively closing said ports;
   means for mounting said flap member in said housing comprising a first mounting means mounting the flap for pivoting about a first predetermined axis to a position closing one of said ports and a second mounting means mounting the flap for pivoting about a second predetermined axis to a position closing another of said ports, at least one of said first and second mounting means being selectively disengageable; and
   means for selectively disengaging said disengageable mounting means.

2. The fluid distribution valve of claim 1 wherein said mounting means are adapted and arranged to support pivoting of said flap member from a first predetermined position to a second predetermined position and from said first predetermined position to a third predetermined position.

3. The fluid distribution valve of claim 2 wherein in said first predetermined position, said flap member is seated to provide closure of a selected one of said ports.

4. The fluid distribution valve of claim 3 wherein said first mounting means additionally comprised a means for guiding said flap member from said first to said second predetermined position.

5. The fluid distribution valve of claim 4 wherein said second mounting means additionally includes means for guiding said flap member from said first to said third position.

6. The fluid distribution valve of claim 4 wherein said first mounting means is adapted and arranged for gravitational force to return said flap member from said second to said first predetermined position when said selected one of said ports is oriented substantially horizontally.

7. The fluid distribution valve of claim 5 wherein said second mounting means is adapted and arranged for gravitational force to return said flap member from said third to said first predetermined position when said selected one of said ports is oriented substantially horizontally.

8. The fluid distribution valve of claim 2 wherein said disengageable one of said mounting means comprises an electromagnet positioned adjacent one of said first and said second predetermined axes and wherein said flap comprises a magnetically attractable material positioned adjacent said one of said axes.

9. The fluid distribution valve of claim 2 wherein said disengageable one of said mounting means comprises a permanent magnet positioned adjacent one of said first and said second predetermined axes and additionally includes a means moving said flap away from said one of said predetermined axes and wherein said flap comprises a magnetically attractable material positioned adjacent said one of said axes.

10. The fluid distribution valve of claim 3 additionally comprising means for forcing fluid inwardly through said selected one of said ports and wherein said flap member has a size and mass selected such that said flap member pivots about one of said predetermined axes in response to said means for forcing fluid.

11. The fluid distribution valve of claim 2 additionally comprising means for returning said flap member from said second to said first predetermined position.

12. The fluid distribution valve of claim 11 additionally comprising means for returning said flap member from said third to said first predetermined position.

13. The fluid distribution valve of claim 3 comprising an air conditioning system arranged to force cooled air through said selected one of said ports.

14. The fluid distribution valve of claim 13 additionally comprising a cool storage system including an air forcing means arranged to force air through another of said ports.

15. The fluid distribution valve of claim 14 additionally comprising a control system connected to said air conditioning system, said cool storage system air forcing means and said disengageable mounting means, said control system comprising
   means for concurrently actuating said air conditioning system while disengaging said disengageable mounting means and deactivating said cool storage air forcing means;
   means for concurrently actuating said air conditioning system while engaging said disengageable mounting means and deactivating said cool storage air forcing means; and means for concurrently actuating said cool storage air forcing means while deactuating said air conditioning system.

16. A fluid distribution valve comprising:

a housing having at least first, second and third ports;

a substantially rectangular flap member adapted for selectively closing said ports and comprising a first shaft fixedly attached adjacent one side thereof and a second shaft fixedly attached adjacent an opposed side thereof;

a first mounting means adjacent a first portion of said first port for mounting said flap member for pivoting about said first shaft;

second mounting means adjacent a second portion of said first port for mounting said flap member for pivoting about said second shaft; and means for selectively engaging at least one of said first and second mounting means.

17. The fluid distribution valve of claim 16 wherein said mounting means are adapted and arranged to support pivoting of said flap member from a first position closing said first port to a second position closing said second port and from said first position to a third position closing said third port.

18. The fluid distribution valve of claim 17 wherein said first mounting means additionally includes a means for guiding said flap member from said first to said second position.

19. The fluid distribution valve of claim 17 wherein at least one of said shafts comprises a magnetically attractable material and a corresponding one of said first and second mounting means comprises an electromagnet and wherein said means for selectively engaging at least one of said first and second mounting means comprises means for actuating said electromagnet.

20. The fluid distribution valve of claim 17 wherein at least one of said shafts comprises a magnetically attractable material and a corresponding one of said first and second mounting means comprises a permanent magnet and wherein said means for selectively engaging at least one of said first and second mounting means comprises a means for moving one of said first and second shafts away from said electromagnet.

21. The fluid distribution valve of claim 17 additionally comprising means for forcing air inwardly through said first port and wherein said flap member has a size and mass selected such that said flap member pivots about one of said shafts in response to said means for forcing air.

22. The fluid distribution valve of claim 17 wherein said first and second mounting means are adapted and arranged for gravitational force to return said flap member from said second to said first position and from said third to said first position when said first port is oriented substantially horizontally.

* * * * *